United States Patent Office 3,352,830
Patented Nov. 14, 1967

3,352,830
POLYURETHANES FROM 1 - ISOCYANATO-
3 - ISOCYANATOMETHYL - 3,5,5 - TRI - AL-
KYLCYCLOHEXANE
Karl Schmitt, Herne, and Fritz Gude, Wanne-Eickel,
Germany, assignors to Scholven-Chemie Aktien-
gesellschaft, Gelsenkirchen-Buer, Germany, a cor-
poration of Germany
No Drawing. Filed July 16, 1965, Ser. No. 472,700
Claims priority, application Germany, July 21, 1964,
Sch 35,501
5 Claims. (Cl. 260—77.5)

ABSTRACT OF THE DISCLOSURE

Polyurethane of 1-isocyanato-3-isocyanato-methyl-3,5,
5-trialkylcyclohexane and an alcohol containing at least
2 hydroxy groups. The polyurethanes can be produced by
first reacting an alcohol with the 3-isocyanato-methyl
group, and thereafter reacting the 1-isocyanato group with
a different alcohol. These polyurethanes have utility as
baking lacquers.

It is already known to react organic molecules having
one or more isocyanato groups with organic compounds
having one or more OH-groups. In this way urethanes are
obtained. In principle, it is possible to add to isocyanate
groups all organic compounds with H-atoms replaceable
by alkali metal.

If the diisocyanates are reacted with glycols, linear
polyaddition products are obtained which are notable and,
particularly in the low molecular range, are frequently
soluble in organic solvents, such as chlorobenzenes, nitro-
benzene, etc. They are thermoplastically deformable. The
polyurethanes can be used both in the lacquer and varnish
industry and for the manufacture of threads, bristles,
injection moldings, etc.

Polyisocyanates (more than two isocyanate groups)
and glycols or diisocyanate and polyalcolhols or poly-
isocyanates and polyalcohols react with each other to
form cross-linked infusible compositions which are in-
soluble in solvents. The closer the cross-linked groups
are to each other in the molecule, the more rigid the
plastic. If, however, the points of cross-linkage are suffi-
ciently far apart, plastics of the consistency of soft rub-
ber can be obtained.

The subject matter of the present invention is the use
of a diisocyanate of the formula

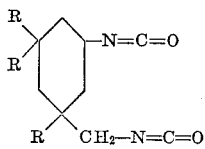

wherein each R is alkyl (the R's can be different),
preferably lower alkyl, e.g. alkyl groups containing up to
about 4 carbon atoms. The diisocyanate wherein each R
is methyl, namely 1-isocyanato-3-isocyanatemethyl-3,5,5-
trimethylcyclohexane is especially preferred. The diiso-
cyanates can be produced by known procedures. For
example the trimethyl derivative can be synthesized rela-
tively simply from acetone via isophorone and 3-(amino-
methyl)-3,5,5-trimethyl-cyclohexylamine.

In this connection, one proceeds in the following man-
ner.

By the addition of hydrocyanic acid to isophorone,
3-cyano-3,5,5-trimethyl cyclohexanone is first of all ob-
tained. This method can proceed in various manners.
For instance, it is possible to form a mixture of iso-
phorone with sodium cyanide, methanol and water and
add glacial acetic acid, drop by drop, into said mixture,
whereby hydrocyanic acid is liberated. The desired nitrile
is then produced. One can also operate at elevated tem-
peratures of between 125 and 275° C., in which case the
ketone is first mixed with the alkali and hydrocyanic acid
is then added drop by drop. There is particularly advan-
tageous the method in which isophorone and hydrocyanic
acid are conducted over an alkaline catalyst applied to
solid supports (for instance NaOH on clay shards), the
hydrocyanic acid being used in quantities which do not
exceed about 10% by weight of the total mixture used.
No solvent need be employed. The temperature range is
approximately between 50 and 350° C. One operates
under normal pressure. The 3-cyano-3,5,5-trimethylcyclo-
hexanone obtained in vacuum upon the distillative purifi-
cation is then hydrogenated on a cobalt, nickel or iron
fixed-bed catalyst (for instance 10 to 40% by weight Co
on kieselguhr) with hydrogen in the presence of am-
monia, about 10 to 30 mols $NH_3$ per mol of ketonitrile
being used, at temperatures between 50 and 150° C. and
pressures of about 120 to 150 atmospheres; the partial
pressure of the hydrogen should in this connection not
exceed about 50 atmospheres. The 3-amino-methyl-3,5,5-
trimethylcyclohexylamine-(1) (which is the subject of
application Ser. No. 382,922, filed July 15, 1964) ob-
tained from the subsequent vacuum distillation is first of
all reacted in a suitable solvent with hydrochloric acid
to form the hydrochloride. Thereupon phosgene is intro-
duced into this solution which is at a temperature of 100
to 150° C. Thereupon distillation is effected in vacuum.
The diisocyanate of the above formula passes over as a
water-clear liquid at 158 to 159° C. and 15 mm. Hg
pressure; $n_D^{25} = 1.4820$.

According to the invention the diisocyanate is reacted
in known manner with alcohol containing at least 2 hy-
droxy groups for the production of polyurethanes.

In order to produce thermoplasts, the diisocyanate can
be reacted in known manner with glycols such as ethylene
glycol, 1,3-propylene glycol, 1,4-butane diol or any de-
sired dialcohols, which may also bear isocyclic, aromatic
heterocyclic or even linear hetero groups, such as even
ester groups. This compound can be used both as diiso-
cyanate by itself or in the presence of other iso-, diiso-
or polyisocyanates. In the case of the polyisocyanates,
therefore, cross-linked plastics which are no longer ther-
moplastically deformable can be produced. With poly-
alcohols or dialcohol/polyalcohol mixtures, a reaction
forming infusible masses is also possible. Depending on
the nature and number of the cross-linkings, it is even
possible to produce both very firm, brittle masses and
plastics having the elastic properties of rubber. Of course,
all of these polymers can be treated with the customary
fillers, such as carbon black, aluminum oxide, talcum,
sawdust, etc., as well as colorants.

The reaction of glycols or polyalcohols and diisocya-
nate can be carried out directly without diluents, in which
connection temperatures within the range of about 50 to
300° C. may be necessary, depending on the nature of
the reaction components. One can also operate in
diluents, for instance halobenzenes.

Depending on the variation of the molar ratio, the
components, the removal of the heat of reaction from the
melt, increase of the time of stay in dissolved state, the
addition of monofunctional and therefore chain-breaking
components, one can vary the molecular weight of the
polyurethane in known manner. In general, it is necessary
for use in the plastics field to polymerize above the aver-
age molecular weight of about 6000. Low molecular types
enter into question primarily for the field of lacquers and
varnishes.

The water-absorption capacity of this urethane is less than that of the corresponding polyamides.

The incorporating of benzene rings into the chain of the alcohols gives more brittle products. It is possible to counteract the brittleness in its turn by a longer $CH_2$- chain.

By the use of a mixture of different glycol components, the melting point of the polyurethane generally is decreased while its solubility in hydrocarbons is increased. They have a considerably larger thermoplastic range, greater softness, as well as better compatibility with plasticizers.

By use of the isocyanate in accordance with the present invention, it is possible also easily to produce baking lacquers with polyalcohols. The activity of the isocyanate groups is in general not so great that there is any danger of a swelling of the undiluted mixtures of polyalcohols and the diisocyanate at room temperature, particularly if organic bases, alkalis and heavy metal salts are carefully excluded.

It is known that the activity of the isocyanato groups can be affected considerably by neighboring groups in the molecule. Thus for instance a diisocyanate group on the aromatic ring is more active than one on an aliphatic chain which in its turn reacts substantially more easily than an isocyanato group on the alicyclic ring. While the isocyanates available on the market are practically all of symmetrical structure or else otherwise practically of equally strong reactivity, the activity of the two isocyanato groups of the compound which is the concern of the invention differs considerably therefrom. Within the same molecule, an isocyanato group is connected directly with the alicyclic ring and is therefore relatively little active, while the second isocyanato group is seated on an aliphatic C-atom. In this way, a further possibility of variation is afforded. One can for instance, first of all react with ½ mol glycol per mol of diisocyanate under mild conditions. The reaction will take place substantially with the active isocyanato groups, i.e., the groups attached to the methyl group. One can now react with ½ mol of another glycol under sharper conditions which then adds onto the isocyanato groups on the alicyclic ring. In this way, urethanes with alternating glycol radicals are obtained.

Accordingly, the invention includes reacting a diisocyanate of the formula above in a first step, with an alcohol containing at least 2 hydroxy groups for reaction of the alcohol and 3-isocyanatomethyl group to form a polyurethane linkage, the mol proportion of the alcohol to diisocyanate being less than one, and thereafter in a second step reacting resulting product with a different alcohol containing at least 2 hydroxy groups for reaction of said different alcohol and 1-isocyanato group to form a polyurethane linkage. By polyurethane linkage is meant the linkage

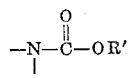

wherein the nitrogen and carbonyl group are from the diisocyanate and —OR' is from the alcohol.

Of course, foams can be produced in the customary manner with the diisocyanate and carboxyl-containing substances.

EXAMPLE 1

*Polyaddition in the melt*

All polyurethanes listed in the following table were prepared by addition of 1-isocyanato-3-isocyanatomethyl-3,5,5-trimethylcyclohexane to the alcohols listed below in a molar ratio of 1:1 (—OH:—NCO) under dry nitrogen. The reaction temperatures were 100° C. during the first 3 hours and 170° C. during the following 5 hours.

| | Alcohol | Properties of the Polyurethanes |
|---|---|---|
| (a) | Butanediol-1,4 | Brittle, hard, transparent. |
| (b) | Hexanediol-1,6 | Do. |
| (c) | Decanediol-1,10 | Medium hard (ball indentation hardness 1011–915). |
| (d) | Dipropylene glycol | Medium hard (ball indentation hardness 1215), transparent. |
| (e) | Triethylene glycol | Soft, transparent. |
| (f) | 3-methyl-2,4-pentanediol | Hard, transparent, brittle. |
| (g) | Trimethylhexanediol-1,6 | Hard (ball indentation hardness 1315–1239) transparent. |
| (h) | Polyester consisting of: 0.39 mol percent ethylene glycol. 0.01 mol percent glycerin. 0.1 mol percent propylene glycol. 0.5 mol percent adipic acid. Acid number 9. OH-number 72. | Elastic, transparent. |
| (i) | Polyester consisting of: 0.49 mol percent ethylene glycol. 0.01 mol percent glycerin. 0.5 mol percent adipic acid. Acid number 3.5. OH-number 84. | Soft, transparent. |

EXAMPLE 2

A mixture of 1-isocyanato-3-isocyanatemethyl-3,5,5-trimethylcyclohexane and glycerol below in a molar ratio of 1.5:1 (—OH:—NCO=1:1) was heated within ½ hour to 170° C. with agitation under dry nitrogen.

The reaction started with great foam forming and was finished after ¼ hour.

The recovered polyurethane was brittle and unsoluble in aromatic and aliphatic hydrocarbon and in ester.

EXAMPLE 3

A mixture of 2 mol of 1-isocyanato-3-isocyanatemethyl-3,5,5-trimethylcyclohexane and 1 mol of trimethylhexamethylendiol was heated in ½ hour to 170° C. After 1 hour 1 mol triethylene glycol was added to the solution upon the further reaction at about 170° C. viscosity increased.

The recovered polyurethane was hard, solid, transparent and soluble in aromatic hydrocarbon and ester.

EXAMPLE 4

*Polyaddition in solution*

(a) 1.5 grams of butanediol-1,4 suspended in 50 cc. of chlorobenzene was heated with agitation to 90° C. Into the solution which was now clear, there was added the diisocyanate in 100 cc. of o-dichlorobenzene (molar ratio —OH:—NCO 1:1). In a short time, there was an increase in temperature to 110° C. Upon reaction for 3½ hours at about 110° C., no solid polymer had precipitated. The o-dichlorobenzene was now distilled off in vacuum and as residue there was obtained a vitreous, brittle plastic in a yield of 96.5%.

(b) In the same manner as indicated under 2a, the diisocyanate was added to trimethyl hexamethyl glycol. The glycol consists of a mixture of about 50% by weight 2,2-dimethyl-4-methyl-hexamethylene glycol and 50% by weight 2-methyl-4,4-dimethylhexamethylene glycol-1,6. In this case also no substance precipitated during the polyaddition. After the solvent had been distilled off, a polyadduct which was also vitreous and brittle was obtained in a yield of 92.5%.

The plastics recovered under 2a and 2b were soluble in decahydronaphthalene, o-dichlorobenzene and chloroform, as well as in hot xylene.

What is claimed is:

1. Polyurethane of 1-isocyanato-3-isocyanatomethyl-3,5,5-trialkylcyclohexane and an alcohol containing at least 2 hydroxy groups.

2. Polyurethane of 1-isocyanato-3-isocyanatomethyl-3,5,5-trialkylcyclohexane and diol.

3. Polyurethane of at least one isocyanate and an alcohol containing at least 2 hydroxy groups, said isocyanate including 1-isocyanato-3-isocyanatomethyl-3,5,5-trimethylcyclohexane.

4. Method of producing polyurethane which comprises contacting in a first step a diisocyanate of the formula

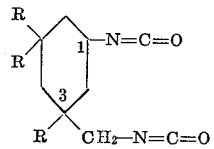

wherein each R is alkyl, with an alcohol containing at least 2 hydroxy groups for reaction of the alcohol and 3-isocyanatomethyl group to form a polyurethane linkage, the mol proportion of the alcohol to diisocyanate being less than one, and thereafter in a second step contacting resulting product with a different alcohol containing at least 2 hydroxy groups for reaction of said different alcohol and 1-isocyanato group to form a polyurethane linkage.

5. Method of claim 4, wherein said mol proportion is about 0.5 and mols of said different alcohol used in said second step is about equal to the mols of alcohol used in said first step.

References Cited
UNITED STATES PATENTS

| | | | |
|---|---|---|---|
| 2,511,544 | 6/1950 | Rinke et al. | 260—77.5 |
| 2,734,045 | 2/1956 | Nelson | 260—77.5 |
| 2,808,391 | 10/1957 | Pattison | 260—77.5 |
| 3,061,559 | 10/1962 | Henson et al. | 260—77.5 |
| 3,108,092 | 10/1963 | Russell et al. | 260—75 |

H. D. ANDERSON, *Assistant Examiner.*

WILLIAM H. SHORT, *Primary Examiner.*